(12) United States Patent
Huang et al.

(10) Patent No.: US 10,859,515 B2
(45) Date of Patent: Dec. 8, 2020

(54) METHOD AND SYSTEM FOR SPECTRAL CHARACTERIZATION IN COMPUTED TOMOGRAPHY X-RAY MICROSCOPY SYSTEM

(71) Applicant: Carl Zeiss X-ray Microscopy, Inc., Pleasanton, CA (US)

(72) Inventors: Zhifeng Huang, Pleasanton, CA (US); Thomas A. Case, Walnut Creek, CA (US); Lourens B. Steger, Pleasanton, CA (US)

(73) Assignee: Carl Zeiss X-ray Microscopy, Inc., Pleasanton, CA (US)

( * ) Notice: Subject to any disclaimer, the term of this patent is extended or adjusted under 35 U.S.C. 154(b) by 711 days.

(21) Appl. No.: 15/465,937

(22) Filed: Mar. 22, 2017

(65) Prior Publication Data
US 2017/0276620 A1 Sep. 28, 2017

Related U.S. Application Data

(60) Provisional application No. 62/312,042, filed on Mar. 23, 2016.

(51) Int. Cl.
*G01N 23/087* (2018.01)
*G01N 23/046* (2018.01)

(52) U.S. Cl.
CPC ......... *G01N 23/087* (2013.01); *G01N 23/046* (2013.01); *G01N 2223/309* (2013.01);
(Continued)

(58) Field of Classification Search
CPC ..... G01N 2223/3032; G01N 2223/309; G01N 2223/313; G01N 2223/401;
(Continued)

(56) References Cited

U.S. PATENT DOCUMENTS

| | | | |
|---|---|---|---|
| 6,633,627 B2 | 10/2003 | Horiuchi | |
| 6,748,043 B1 | 6/2004 | Dobbs | |

(Continued)

FOREIGN PATENT DOCUMENTS

| | | | |
|---|---|---|---|
| CN | 104995690 A | 10/2015 | |
| CN | 105073010 A | 11/2015 | |

(Continued)

OTHER PUBLICATIONS

E. Sidky, L. Yu, X. Pan, Y. Zou and M. Vannier, "A robust method of x-ray source spectrum estimation from transmission measurements: Demonstrated on computer simulated, scatter-free transmission data," Journal of Applied Physics 97, 124701 (2005). Eleven pages.

(Continued)

*Primary Examiner* — Dani Fox
*Assistant Examiner* — Soorena Kefayati
(74) *Attorney, Agent, or Firm* — HoustonHogle LLP

(57) ABSTRACT

A spectrum measurement and estimation method for tomographic reconstruction, beam hardening correction, dual-energy CT and system diagnosis, etc., comprises determining the spectra for combinations of source acceleration voltage, pre-filters and/or detectors and after measuring the transmission values of several pre-filters, calculating corrected spectra for the combinations of the source acceleration voltage, pre-filters and/or detectors.

19 Claims, 7 Drawing Sheets

(52) U.S. Cl.
CPC ........... *G01N 2223/3032* (2013.01); *G01N 2223/313* (2013.01); *G01N 2223/401* (2013.01); *G01N 2223/418* (2013.01); *G01N 2223/419* (2013.01)

(58) Field of Classification Search
CPC ....... G01N 2223/418; G01N 2223/419; G01N 23/046; G01N 23/087; A61B 6/032; A61B 6/06; A61B 6/4042; A61B 6/4085; A61B 6/4208; A61B 6/4233; A61B 6/4241; A61B 6/482; A61B 6/58
See application file for complete search history.

(56) References Cited

U.S. PATENT DOCUMENTS

| | | | |
|---|---|---|---|
| 6,973,158 B2 | 12/2005 | Besson | |
| 7,050,529 B2 | 5/2006 | Hoffman | |
| 9,128,584 B2 | 9/2015 | Case et al. | |
| 10,182,775 B2* | 1/2019 | Nakai | A61B 6/482 |
| 2004/0190679 A1* | 9/2004 | Waggener | A61B 6/482 378/54 |
| 2005/0259784 A1* | 11/2005 | Wu | A61B 6/032 378/19 |
| 2006/0023844 A1* | 2/2006 | Naidu | G01T 1/185 378/210 |
| 2006/0109949 A1* | 5/2006 | Tkaczyk | A61B 6/032 378/4 |
| 2006/0280281 A1* | 12/2006 | Flohr | A61B 6/482 378/5 |
| 2008/0279328 A1* | 11/2008 | Zeitler | A61B 6/032 378/4 |
| 2010/0027867 A1* | 2/2010 | Bernhardt | A61B 6/482 382/132 |
| 2010/0158385 A1* | 6/2010 | Jeung | G01N 23/087 382/191 |
| 2011/0121163 A1* | 5/2011 | Kang | G01T 1/36 250/252.1 |
| 2013/0110438 A1* | 5/2013 | Rinkel | G06F 17/18 702/85 |
| 2013/0156163 A1* | 6/2013 | Liu | G06T 11/005 378/207 |
| 2014/0005533 A1* | 1/2014 | Grasruck | A61B 6/481 600/425 |
| 2014/0233692 A1 | 8/2014 | Case et al. | |
| 2015/0063529 A1* | 3/2015 | Taguchi | A61B 6/482 378/5 |
| 2015/0198725 A1* | 7/2015 | Tamura | A61B 6/482 378/5 |
| 2015/0243022 A1* | 8/2015 | Petschke | A61B 6/032 382/131 |
| 2016/0022243 A1* | 1/2016 | Nakai | A61B 6/4042 378/5 |
| 2016/0095564 A1* | 4/2016 | Kato | A61B 6/52 378/19 |
| 2016/0235382 A1* | 8/2016 | Besson | A61B 6/4007 |
| 2017/0131224 A1* | 5/2017 | Paulus | G01N 23/207 |
| 2017/0186195 A1* | 6/2017 | Lin | A61B 6/5282 |
| 2017/0202531 A1* | 7/2017 | Nitta | A61B 6/06 |

FOREIGN PATENT DOCUMENTS

| | | |
|---|---|---|
| EP | 3 223 002 A1 | 9/2017 |
| JP | 2014210180 A | 11/2014 |
| JP | 6289223 | 3/2018 |
| WO | WO 2014163187 | 10/2014 |

OTHER PUBLICATIONS

L. Zhang, G. Zhang, Z. Chen, Y. Xing, J. Cheng and Y. Xiao, "X-ray spectrum estimation from transmission measurements using the expectation maximization method," 2007 IEEE Nuclear Science Symposium Conference Record, M13-293, 3089-3993. Five pages.
European Search Report dated Jul. 14, 2017, from European Application No. 17162400.0, filed Mar. 22, 2017, 13 pages.

* cited by examiner

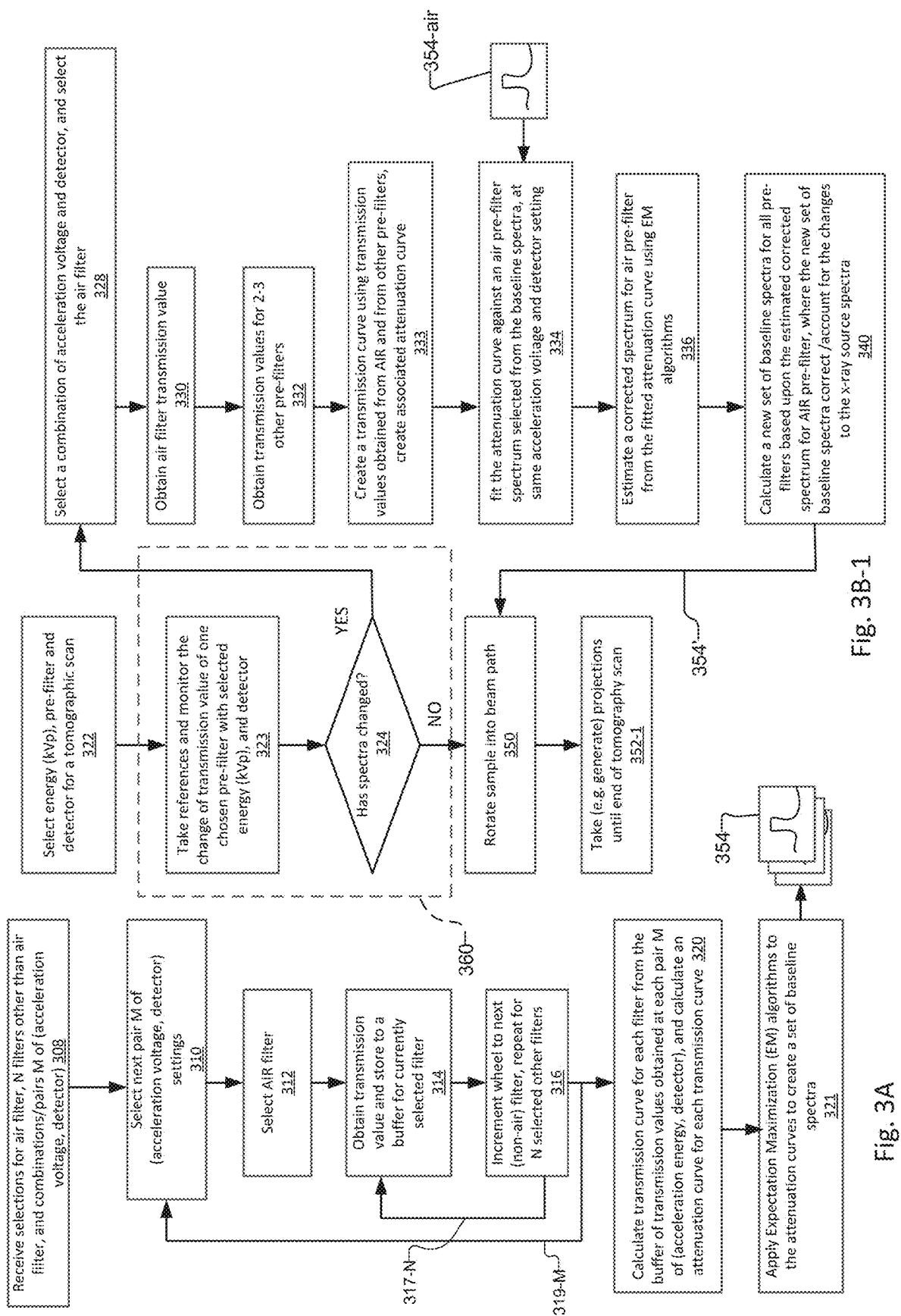

METHOD AND SYSTEM FOR SPECTRAL CHARACTERIZATION IN COMPUTED TOMOGRAPHY X-RAY MICROSCOPY SYSTEM

RELATED APPLICATIONS

This application claims the benefit under 35 USC 119(e) of U.S. Provisional Application No. 62/312,042, filed on Mar. 23, 2016, which is incorporated herein by reference in its entirety.

BACKGROUND OF THE INVENTION

X-ray computed tomography (CT) is a non-destructive technique for inspecting and analyzing internal structures of samples. In general, x-rays are absorbed or scattered as the x-rays travel through the sample. The x-rays not absorbed or scattered away are then detected by a detector system. The image formed at the detector system is known as an x-ray projection. Tomographic volume data sets are then reconstructed from a series of these projections at different angles via standard CT reconstruction algorithms such as Filtered Back Projection (FBP).

Some x-ray CT systems utilize polychromatic x-ray sources to generate the x-ray projections. Polychromatic x-ray sources include x-ray tubes (laboratory sources), white synchrotron beams, or accelerator-based sources. In general, polychromic x-ray beams emitted from the sources contain x-rays having many different energies. The distribution of the x-rays as a function of energy is typically referred to as the beam's spectrum. Polychromatic x-ray beams are distinguished from monochromatic beams that contain x-rays of only a single energy or very narrow ranges of energies.

White synchrotron beams are one type of polychromatic x-ray source. As electrons accelerate through the synchrotron, the electrons emit an intense "white" beam of polychromatic radiation at a narrow angle tangential to the ring. The beam includes radiation ranging from soft ultraviolet to hard x-rays. Monochromatic x-ray sources can be created from the white polychromatic beam by applying filters such as monochromator crystals and/or x-ray mirrors which pass/reflect radiation of selected energies.

Laboratory sources such as x-ray tubes also produce polychromatic x-ray beams typically using either fixed or rotating anodes, Within an evacuated tube, a filament (e.g. tungsten) acts as a cathode and a metal target acts as an anode. A high (acceleration) voltage is applied to the cathode, creating a high potential between the cathode and anode. This causes electrons to flow and accelerate across the vacuum from the cathode to the anode. Electrons collide with the anode material and accelerate other electrons, ions and nuclei within the anode material. This process generates x-rays. The spectra of the x-rays produced by x-ray tubes are a function of the anode target material and the acceleration voltage. The spectra are characterized by a continuous spectrum of bremsstrahlung ("braking radiation") x-rays, and secondary x-ray emissions at specific frequencies produced due to ionization and de-excitation of core electrons of the anode material, also known as x-ray fluorescence (XRF). The secondary x-ray emissions, or lines, are characteristic of the metal used in the anode material. The bremsstrahlung radiation is the dominant source of x-rays and can be used as a polychromatic x-ray source, while x-ray filters and/or x-ray mirrors can be applied to the characteristic x-ray emissions and/or the bremsstrahlung radiation to produce monochromatic x-rays, in examples.

The spectra of x-rays emitted by x-ray sources can change over time with use of the x-ray source. In x-ray tubes, for example, portions of the target material are ablated/removed from the target as the electrons strike the anode target material. This causes the target to lose mass (e.g. become thinner) over time. This phenomenon is also known as "source target burn." As the target becomes thinner, the target increasingly passes more x-rays of a lower x-ray energy, thereby causing changes to the x-ray spectrum of the x-rays over time.

Use of polychromatic x-ray beams in x-ray CT systems have advantages. The main advantage of using polychromatic x-ray beams is that they are typically more powerful than monochromatic x-ray beams for a given source. This is because lossy energy filters are avoided.

The use of polychromatic x-ray beams have disadvantages, however. Unlike a monochromatic beam, the x-ray absorption of a polychromatic x-ray beam is generally not proportional to the sample material thickness. This is because lower x-ray energies of the polychromatic x-ray beam are absorbed more by the sample than higher x-ray energies as the beam transverses the sample. As a result, a process known as beam hardening (BH) occurs when polychromatic x-ray beams are used to generate x-ray projections. Beam hardening is associated with a change in x-ray spectrum towards higher x-ray energies as the x-rays pass through the sample.

Beam hardening often yields artifacts in tomographic reconstructions from polychromatic x-rays. Typical artifacts generated as a consequence of beam hardening include cupping artifacts and streak artifacts. In general, elements within the sample having a higher atomic number (Z) such as metals yield more BH artifacts in the tomographic reconstructions images than do low-Z elements.

In order to reduce or prevent artifacts in tomographic reconstructions created from polychromatic x-ray beams, it is important to have a priori knowledge of the exact energy spectra of the x-rays emitted from the x-ray source of the system and of the sensitivities of one or more detectors of the detector system at different x-ray energies. Thus, x-ray source spectrum measurement or estimation is typically the key issue in artifact reduction in tomographic reconstructions of a sample created from X-ray CT systems using polychromatic x-ray sources.

For a given combination of the acceleration voltage of the x-ray source (kVp), pre-filter and detector in an x-ray imaging/CT system, a typical procedure of spectrum measurement and estimation is as follows: 1) use known standard phantoms (like a step wedge phantom and a cone phantom) to obtain x-ray transmission value measurements; and 2) estimate the actual spectrum of this combination by some kind of iterative algorithm (e.g. Expectation Maximization (EM) algorithm) based on the transmission measurements. In general, a Monte Carlo simulation spectrum is used as an initial input. See L. Zhang, G. Zhang, Z. Chen, Y. Xing, J. Cheng and Y. Xiao, "X-ray spectrum estimation from transmission measurements using the expectation maximization method," 2007 IEEE Nuclear Science Symposium Conference Record, M13-293, 3089-3993; and E. Sidky, L. Yu, X. Pan, Y. Zou and M. Vannier, "A robust method of x-ray source spectrum estimation from transmission measurements: Demonstrated on computer simulated, scatter-free transmission data," Journal of Applied Physics 97, 124701 (2005). Both of these articles are incorporated herein by reference.

SUMMARY OF THE INVENTION

Current procedures for x-ray source spectrum measurement and estimation in x-ray CT systems have disadvantages. Because most current flexible x-ray CT systems support multiple acceleration voltage, pre-filters and/or detectors, the transmission measurement procedure must be repeated for each combination of the acceleration voltages, pre-filters, and detectors. As a result, the x-ray source spectrum measurement and estimation of the various combinations is time consuming.

Further, phantom-based x-ray source spectrum measurement/calibration is not suitable for long-running tomography scans. Since the energy spectra of the x-rays produced by x-ray sources change over time (and even during a scan), long-running scans typically require at least one mid-scan recalibration using a standard phantom to measure changes to the energy spectra of the x-rays emitted by the x-ray source. For this purpose, the operator typically stops the scan, removes the sample (and usually the sample holder as well) from the x-ray CT system, and places a standard phantom into the beam path to execute the x-ray source spectrum measurement. Upon completion of the calibration(s), the operator removes the phantom, replaces the sample holder including the sample and resumes the scan. This kind of x-ray source spectrum calibration is inconvenient, time-consuming, and can introduce errors in the tomographic reconstructions generated after the sample is replaced and the scan is resumed. These errors can result if the sample is not positioned precisely into the path of the beam as before the spectral recalibration, in one example.

The x-ray spectra of the x-rays emitted from the x-ray source are the main characteristic of X-ray CT systems. X-ray source spectrum calibration and measurement can thus be used to the diagnosis of problems with and/or maintenance of these systems.

The invention is a simplified x-ray spectrum measurement estimation system and method. It utilizes a few pre-filters having different materials and/or different thicknesses as an x-ray source spectrum measurement and/or calibration tool instead of using conventional step wedge phantoms or cone phantoms. In one embodiment, measurement and calibration of the x-ray source spectrum utilizes a standard filter wheel component of x-ray CT systems. The filter wheels typically include a dozen or more pre-filters located near the x-ray source output spot. The pre-filters are used to remove x-rays of different energies from the emitted beam of x-rays before the beam of x-rays are incident upon the sample. Another aspect of the invention concerns a software program to be executed on a computer system of an x-ray CT system.

Because x-ray CT systems do not operate in a vacuum and use air as a transmission medium for its beam of emitted x-rays, the x-ray CT systems must account for a small amount of absorption of the x-rays due to air molecules when using the pre-filters of different thicknesses/densities of the filter wheel. For this purpose, preferably, one of the pre-filters is an empty spot within the filter wheel, also known as an air pre-filter. According to principles of the invention, x-ray source transmission measurements are first obtained. For this purpose, no sample is positioned within the x-ray CT system or the sample is shifted out of the beam path of the x-ray source, and transmission measurements for different combinations of filters, x-ray energies and at least one detector are obtained. The transmission measurements for the air pre-filter are typically taken first, followed by the transmission measurements for the pre-filters of different materials and/or non-zero thicknesses. Transmission curves for each pre-filter are plotted from the transmission measurements, attenuation curves for each pre-filter are created from the associated transmission curves, and a set of baseline spectra are then created from the attenuation curves. The baseline spectra includes a spectrum created for and associated with the attenuation curves of each of the pre-filters, including the air pre-filter.

Then, during operation of the x-ray CT system (e.g., during a scan of a sample), a transmission value for one pre-filter such as an air pre-filter is measured and compared to an associated transmission value for the same pre-filter in the set of baseline spectra. This comparison is used to determine whether the x-ray spectrum of the x-ray source has changed over time, i.e. since the baseline spectra were calculated. If the comparison indicates that the x-ray spectrum has changed, the invention can be used to recalibrate by estimating changes to the x-ray spectrum of the x-rays emitted from the x-ray source.

For this purpose, the changes to the x-ray source spectra can be estimated by taking new transmission measurements of only a few (e.g. 2 or 3) selected pre-filters. For this estimation, the new transmission measurements are then "fitted" against corresponding transmission curves (e.g. attenuation curves) from which the baseline spectra were created. Then these calculated spectra are used in the calculation of the tomographic reconstructions determined from the projections of the sample. In other applications, these calculated spectra are used to diagnose problems with the x-ray source or assess remaining lifetime of its target (e.g. anode of a laboratory x-ray tube).

A number of advantages can be achieved by employing the principles of the present invention. First, the new spectrum measurement and calibration method does not need to include a standard step wedge phantom or cone phantom, which are required by current state-of-the-art spectrum measurement methods. Second, there is no longer the need to brute-force measure all the attenuation curves for each of the different combinations of x-ray source acceleration voltages, pre-filters and detectors as in current spectrum measurement methods. Instead, all the attenuation curves of different combinations of source acceleration voltages and pre-filters and detector can be calculated based on fewer measurements of the combinations of at least one acceleration voltages and pre-filters and at least one detector as in the state-of-the-art spectrum measurement methods. One might archive the spectra for many or all combinations of acceleration voltages, pre-filters and detectors, but only the single one being used for a tomography is important at one time. Third, because there is no longer the need to swap out the sample (or sample and sample holder) with the phantom and then replace the sample and resume the scan, the potential for introducing errors into the tomographic reconstructions due to imperfect alignment of the sample is significantly attenuated.

The proposed spectrum measurement and estimation method of the present invention can be used to eliminate or reduce the use of the standard step wedge phantom or cone phantom. Instead, filter wheels of existing x-ray CT systems can be deployed to accomplish the same objective with perhaps only requiring selection of and/or changes to the filters for the requisite pre-filter sets. This simplifies spectrum measurement.

The proposed system and method also requires fewer spectrum measurements to be taken as compared to current systems and methods. Rather, the spectra for the many different combinations of acceleration voltages and pre-filters and detectors can be estimated based on as few as 2 or 3 scans using different selections of pre-filter, acceleration voltages, and detectors of the x-ray CT system. This significantly saves time.

Finally, the proposed system and method eliminates potential calculation errors of current x-ray source spectrum calibration methods due to the need to load the phantom into the x-ray CT system and replace the sample back into x-ray CT system. For example, current methods usually require removing the sample holder and the sample from the system and placing the phantom into the system to execute the x-ray source calibration, and then replacing the sample holder and the sample back into the system to finish the scan of the sample. This process is disruptive and time-consuming. In contrast, with the proposed approach, the operator typically only has to rotate the sample out of the beam path of the x-ray CT system to execute the calibration phase, and then rotate the sample back into the beam path at the previously stored sample alignment settings to execute the scan. The sample need not be removed from the x-ray CT system.

In general, according to one aspect, the invention features an x-ray spectrum measurement and estimation method in an x-ray CT system. The method determines baseline spectra for x-rays emitted from an x-ray source of the x-ray CT system at different combinations of at least one x-ray acceleration voltage, filters and at least one detector. During operation of the x-ray CT system, the method monitors the x-rays to determine changes to the x-ray source spectrum, and in response to determining that the x-ray source spectrum has changed, the method calculates new baseline spectra based upon measuring transmission values of one or more filters, such as at least 2 or 3 filters.

Preferably, the method is used for tomographic reconstruction and beam hardening correction. The method can also be used for multi energy computed tomography and for diagnosis of the x-ray CT system.

In one implementation, the method monitors the x-rays to determine changes to the x-ray source spectrum by obtaining a transmission value using a combination of an x-ray acceleration voltage, one filter, and a detector, and comparing the obtained transmission value to a transmission value within the baseline spectra at the same combination of the x-ray acceleration voltage, the one filter, and the detector.

Typically, the method determines the baseline spectra by obtaining transmission measurements using the combinations of x-ray acceleration voltages, filters and detectors, calculating transmission curves for each of the filters using the transmission measurements, and calculating attenuation curves for each of the filters from the transmission curves.

The method can additionally or alternatively determine the baseline spectra by calculating attenuation curves for each of the filters based upon transmission measurements obtained using the combinations of x-ray acceleration voltages, filters and detectors, and applying Expectation Maximization (EM) algorithms to the attenuation curves.

The method calculates new baseline spectra by identifying a combination of acceleration voltage and detector used to measure the transmission values of the at least 2 or 3 filters, measuring a transmission value for an air filter at the identified acceleration voltage and detector combination, and creating a transmission curve using the transmission values for the air filter and for the at least 2 or 3 filters and creating an attenuation curve from the transmission curve.

The method additionally or alternatively calculates new baseline spectra by selecting an air filter spectrum at the common acceleration voltage and detector combination from the baseline spectra, fitting the attenuation curve against the selected air filter spectrum, and estimating a corrected spectrum for the air filter according to the air filter spectrum at the common acceleration voltage and detector combination within the fitted attenuation curve using EM algorithms.

The method additionally or alternatively calculates new baseline spectra by creating an estimated corrected spectrum for an air filter using the measured transmission values of the at least 2 or 3 filters, and calculating the new baseline spectra from the estimated corrected spectrum for the air filter.

The method preferably calculates new baseline spectra based upon measuring transmission values of at least 2 or 3 filters with no phantoms present.

The method can additionally use the baseline spectra and the new baseline spectra during scans of the sample to correct for beam hardening in tomographic reconstructions of the sample.

In general, according to another aspect, the invention features an x-ray spectrum measurement and estimation method in an x-ray microscope system for applications such as tomographic reconstruction, beam hardening correction, multi (dual) energy computed tomography (CT) and x-ray microscope system diagnosis. The method determines spectra for combinations of x-ray source acceleration voltages, pre-filters and/or detectors. Before operation of the x-ray microscope, the method estimates or calculates spectra for the combinations of the source acceleration voltages, pre-filters and/or detectors from the measured transmission values by measuring transmission values for several pre-filters.

In general, according to another aspect, the invention features an x-ray CT system. The x-ray CT system includes an x-ray imaging system and a computer system having a controller configured to control the components of the x-ray CT system. The x-ray imaging system includes an x-ray source, filters, and a detector system. The computer system determines baseline spectra for x-rays emitted from the x-ray source at different combinations of x-ray acceleration voltages of the x-ray source, filters and detectors of the detector system, monitors the x-ray spectrum to determine changes to the x-ray source spectrum, and in response to determining that the x-ray source spectrum has changed, calculates new baseline spectra based upon measuring transmission values of one or more filters, such as at least 2 or 3 filters.

Preferably, the new baseline spectra are used for tomographic reconstruction and beam hardening correction. The new baseline spectra can also be used for multi energy computed tomography and for diagnosis of the x-ray CT system.

In one implementation, the computer system determines changes to the x-ray source spectra by obtaining a transmission value using a combination of an x-ray acceleration voltage, one filter, and a detector, and comparing the obtained transmission value to a transmission value within the baseline spectra at the same combination of the x-ray acceleration voltage, the one filter, and the detector.

The computer system determines the baseline spectra by obtaining transmission measurements using the combinations of x-ray acceleration voltages, filters and detectors, calculating transmission curves for each of the filters using the transmission measurements, and calculating attenuation curves for each of the filters from the transmission curves.

The computer system can additionally or alternatively determine the baseline spectra by calculating attenuation curves for each of the filters based upon transmission measurements obtained using the combinations of x-ray acceleration voltages, filters and detectors, and applying Expectation Maximization (EM) algorithms to the attenuation curves.

The computer system can additionally or alternatively determine the baseline spectra by identifying a combination of acceleration voltage and detector used to measure the transmission values of the at least 2 or 3 filters, measuring a transmission value for an air filter at the identified acceleration voltage and detector combination, and creating a transmission curve using the transmission values for the air filter and for the 2 or 3 filters and creating an attenuation curve from the transmission curve.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

In the accompanying drawings, reference characters refer to the same parts throughout the different views. The drawings are not necessarily to scale; emphasis has instead been placed upon illustrating the principles of the invention. Of the drawings:

FIG. 3A is a flow diagram showing a method for obtaining a set of baseline spectra for x-rays emitted from the x-ray source of an x-ray CT system, in accordance with principles of the present invention;

FIG. 3B-1 is a flow diagram of a spectrum calibration method for an x-ray CT system, where the method applies the set of baseline spectra from the method of FIG. 3A during execution of a single short-time duration tomographic scan of a sample to generate spectrum-corrected projections of the sample;

FIG. 3B-2 is a flow diagram of a spectrum calibration method for a long duration scan of a sample;

DETAILED DESCRIPTION OF THE PREFERRED EMBODIMENTS

Figure 1:
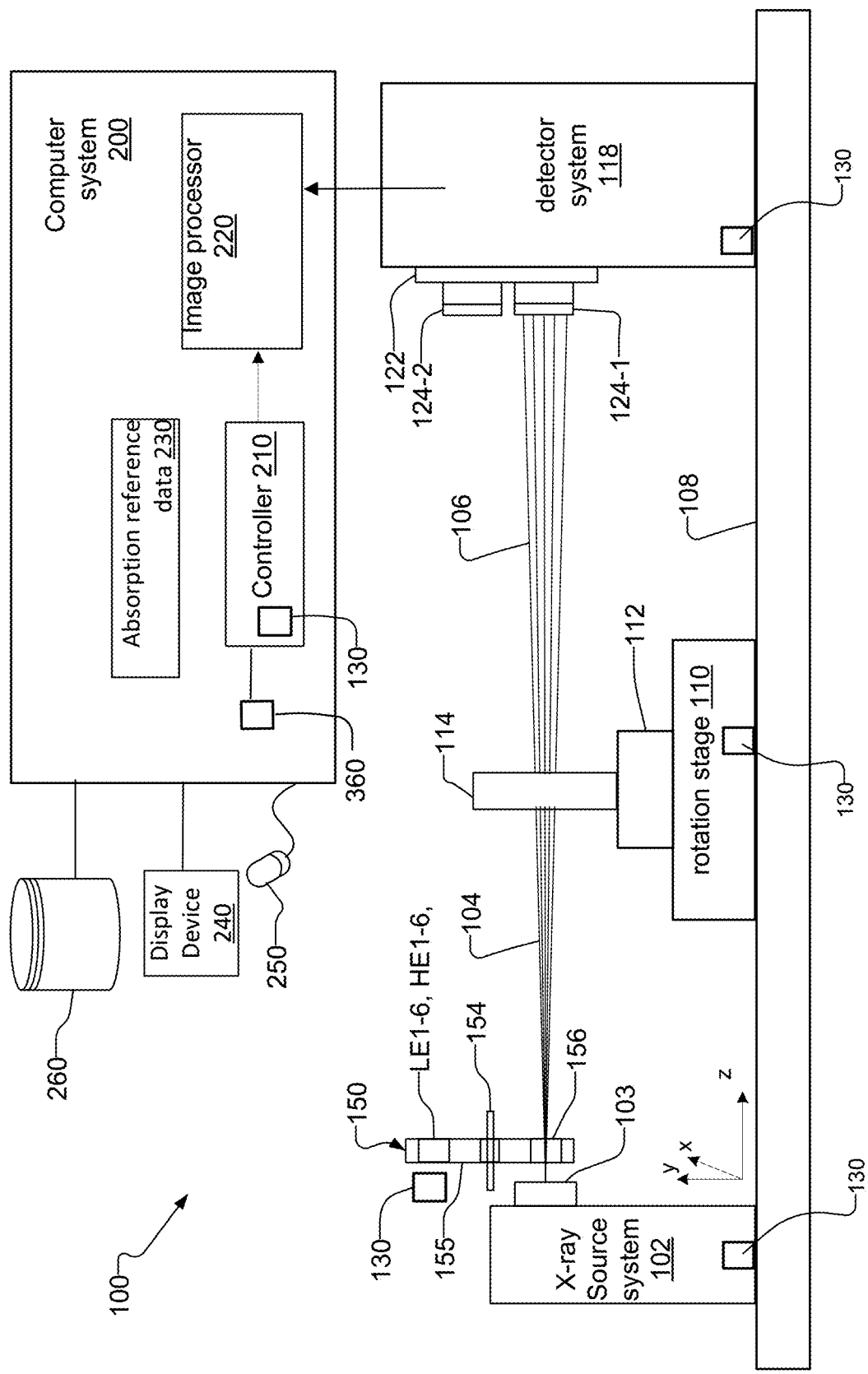
FIG. 1 is a schematic diagram of an x-ray CT system to which the method of the present invention is applicable.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

For monochromatic x-rays, Beer's Law describes that x-rays will be attenuated when x-rays pass through a pure object:

$$I = I_0 e^{-\mu t}$$

where $I_0$ is the x-ray intensity incident on an object, t is the object thickness, and I is the intensity of x-rays transmitted through the object. $\mu$ is the attenuation coefficient of the object (including the effects of Photoelectric absorption and Compton scattering, and electron pair effect if x-ray energy>1.02 MeV), depending on the sample density $\rho$, the atomic number Z, atomic mass A, and the x-ray energy E.

The above formula can be re-written with an integral form $$I = I_0 e^{-\int \mu(l) dl} \text{ and}$$

$$\int \mu(l) dl = -\ln(I/I_0)$$

where l is the beam path through the object. This perfectly satisfies the line integral demand of CT reconstruction algorithms. As a result, no beam hardening (BH) artifacts are introduced for monochromatic x-rays.

Polychromatic x-ray sources, on the other hand, generate x-rays over a spectrum D(E). D(E) also includes the influence of detector sensitivity for simplicity. The intensity I downstream of the object is given by $$I = I_0 \int D(E) e^{-\int \mu(E,l) dl} dE$$

μ(E) is typically a nonlinear function of E, given by $$\mu(E) = \alpha_1 * \frac{1}{E^3} + \alpha_2 * f_{KN}(E) \text{ where}$$

$\alpha_1 \approx K_1 \frac{\rho}{A} Z^n, n \approx 4$ (Photoelectric absorption component), and $\alpha_2 \approx K_2 \frac{\rho}{A} Z$ (Compton scattering component), where $f_{KN}$ is the Klein-Nishina formula.

Because μ(E) is typically a non-linear function of energy E, the transmission of x-rays from polychromatic x-ray sources does not satisfy the line-integral demand of CT reconstruction algorithms. $\mu_{high-energy} < \mu_{low-energy}$, meaning that the materials absorb 'more' low-energy x-rays than high-energy x-rays. The output spectrum of attenuated x-rays transmitted through the sample appears to 'move' to be harder, known as beam hardening (BH). High-Z metal materials have much more serious beam hardening problems, resulting in typical metal artifacts in CT reconstructed tomographic images. These artifacts can be reduced or removed in the tomographic reconstruction, however, if the spectrum of the x-rays emitted from the source is known or can be derived.

FIG. 1 is a schematic diagram of an x-ray CT system 100 to which the method of the present invention is applicable and which is typically susceptible to the beam hardening problem.

In general, the x-ray CT system 100 includes an x-ray source system 102 that generates a polychromatic x-ray beam 104 and a rotation stage 110 with sample holder 112 for holding the sample 114 in the x-ray beam 104 from the x-ray source system 102. Images or x-ray projections are captured by a detector system 118. The x-ray source system 102, the rotation stage 110, and the detector system are mounted to a base 108 of the x-ray CT system 100. A computer system 200 typically receives and processes these images and provides general control of the system 100. The computer system 200 or a special purpose graphics processor will typically perform tomographic reconstruction using the x-ray projections.

The x-ray source 102, in one example, is a polychromatic x-ray source. The polychromatic x-ray source is preferably a laboratory x-ray source because of its ubiquity and relatively low cost. Nonetheless, synchrotron sources or accelerator-based sources are other alternatives.

Common laboratory x-ray sources include an x-ray tube, in which electrons are accelerated in a vacuum by an electric field and shot into a target piece of metal, with x-rays being emitted as the electrons decelerate in the metal. Typically, such sources produce a continuous spectrum of background x-rays (i.e. bremsstrahlung radiation) combined with sharp peaks in intensity at certain energies that derive from the characteristic lines of the target, depending on the type of metal target used. Furthermore, the x-ray beams are divergent and lack spatial and temporal coherence.

In one example, the x-ray source 102 is a rotating anode type or microfocused source, with a Tungsten target. Targets that include Molybdenum, Gold, Platinum, Silver or Copper also can be employed. Preferably, a transmissive configuration of the x-ray source 102 is used in which the electron beam strikes the thin target 103 from its backside. The x-rays emitted from the other side of the target 103 are then used as the beam 104.

In another, more specific example, source 102 is a structured anode x-ray source such as described in U.S. Pat. No. 7,443,953 issued to Yun, et al. ("Yun") on Oct. 28, 2008, the contents of which are incorporated herein by reference in their entirety. In Yun, the source has a thin top layer made of the desired target material and a thicker bottom layer made of low atomic number and low density materials with optimal thermal properties. The anode can include, for instance, a layer of copper with an optimal thickness deposited on a layer of beryllium or diamond substrate.

X-ray lasers producing radiation having an energy suitable for the tomographic applications described herein also can be employed.

In still another example, the x-ray source 102 is a metal jet x-ray source such as are available from Excillum AB, Kista, Sweden. This type of source uses microfocus X-ray tubes in which the anode is a liquid-metal jet. Thus, the anode is continuously regenerated and already molten.

The x-ray beam 104 generated by source 102 has an energy spectrum that is controlled typically by the operating parameters of the source. In the case of a laboratory source, important parameters include the material of the target and the acceleration voltage (kVp). The energy spectrum is also dictated by any conditioning filters that suppress unwanted energies or wavelengths of radiation. For example, undesired wavelengths present in the beam can be eliminated or attenuated using, for instance, an energy filter (designed to select a desired x-ray wavelength range/bandwidth).

In addition to the x-ray source 102, the present invention relies on the availability of filters that filter the x-ray beam 104 before interaction with the sample 114 (pre-filters).

In a preferred embodiment, filters within a standard filter wheel 150 of current x-ray CT systems are used as the pre-filters of the calibration tool. The filters of the filter wheel 150 are placed in the path of the x-ray beam 103 and are inserted between the x-ray source 102 and the sample 114. Operators of current x-ray CT systems use the filters to modify and/or compensate for the beam hardening property of the x-ray output. The filters of the filter wheel 150 are used as the pre-filters of the measurement tool.

In more detail, the filter wheel 150 is controlled by the controller 210 of the computer system 200. The filter wheel 150 includes a frame 155 that rotates on axle 154 under control of the controller 210 via its control interface 130. Via the control interface 130 of the filter wheel 150, an operator can rotate the filter wheel 150 to bring one of the filters of the wheel 150 to be adjacent to the exit aperture on the target 103 of the x-ray source system 102. In this way, the selected filter (in one example, an air pre-filter) is aligned to filter the beam 104 prior to interaction with the sample 114.

Figure 2:
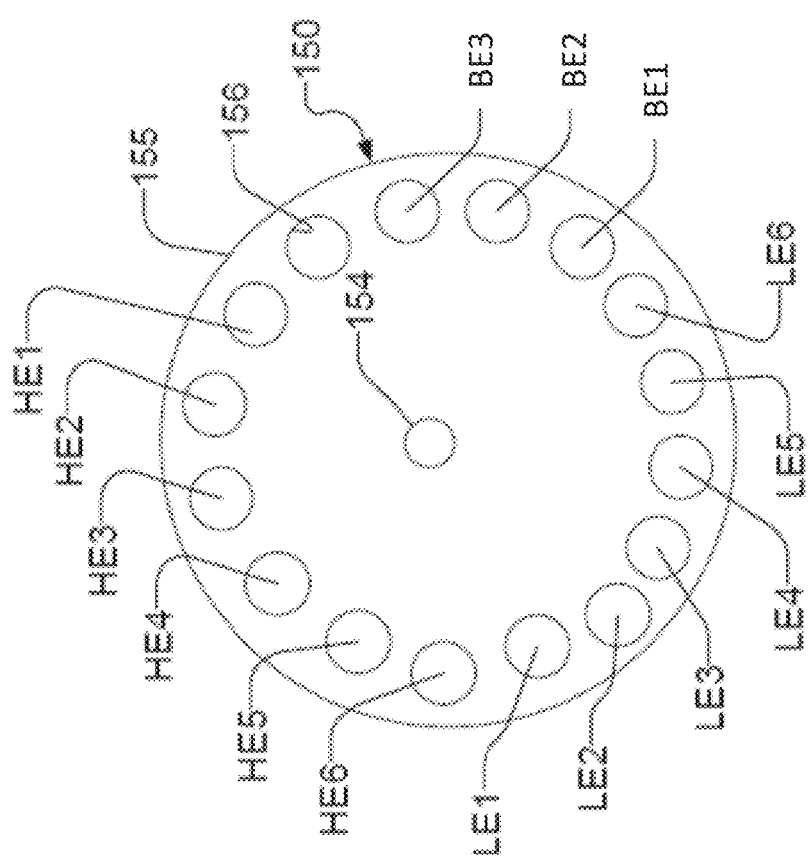
FIG. 2 is a schematic view of an exemplary filter wheel of an x-ray CT system having filters.

FIG. 2 shows one embodiment of the filter wheel 150. The filter wheel 150 includes 16 separate pre-filters that are installed in the frame 155. These pre-filters include six (6) Material #1 filters of increasing thickness (LE1, LE2, . . . , LE6) and six (6) Material #2 filters of increasing thickness HE1, HE2, . . . , HE6). In order to measure the highest energy, 3 Material #3 filters of increasing thickness (BE1, BE2, BE3), and other pre-filters are added into the pre-filter set. Here, Materials #1, #2 and #3 have different densities. In general, Material #1 has a light density for filtering low energy x-rays, Material #2 has a medium density for filtering low and medium energy x-rays and Material #3 has a heavy density for filtering whole-band x-rays. Finally, there is an empty spot 156 in the filter wheel 150 (i.e., air spot or air pre-filter).

Returning to FIG. 1, when the sample 114 is exposed to the x-ray beam 104, the x-ray photons transmitted through the sample form an attenuated x-ray beam 106 that is received by the detector system 118. In some other examples, an objective lens such as a zone plate lens is used to form an image onto the detector system 118 of the x-ray imaging system 100. In alternative embodiments the detector system is a flat panel detector.

In the most common configuration of the detector system 118, a magnified projection image of the sample 114 is formed on the detector system 118 with a geometrical magnification that is equal to the inverse ratio of the source-to-sample distance and the source-to-detector distance. Generally, the geometrical magnification provided by the x-ray stage is between 2× and 100×, or more. In this case, the resolution of the x-ray image is limited by the focus spot size or virtual size of the x-ray source system 102.

To achieve high resolution, an embodiment of the x-ray CT system 100 further utilizes a very high resolution detector 124-1 of the detector system 118 in conjunction with positioning the sample 114 close to the x-ray source system 102. In one implementation of the high-resolution detector 124-1, a scintillator is used in conjunction with a microscope objective to provide additional magnification in a range between 2× and 100×, or more.

Other possible detectors can be included as part of the detector system 118 in the illustrated x-ray CT system 100. For example, the detector system 118 can include a lower resolution detector 124-2, as shown in the illustrated embodiment of FIG. 1. This could be a flat panel detector or a detector with a lower magnification microscope objective, in examples. Configurations of one, two, or even more detectors 124 of the detector system 118 are possible.

Preferably, two or more detectors 124-1, 124-2 are mounted on a turret 122 of the detector system 118, so that they can be alternately rotated into the path of the attenuated beam 106 from the sample 114.

Typically, based on operator defined parameters, the controller 210 of the computer system 250 instructs the rotation stage 110 via the control interface 130 to move the sample 114 out of the beam path during x-ray source system 102 calibration. After completion of the calibration portion, the controller 210 moves the sample 114 back into the beam path and rotates the sample 114 relative to the beam 104 to perform the CT scan of the sample 114.

The detector system 118 creates an image representation, in pixels, of the x-ray photons from the attenuated x-ray beam 106 that interact with a scintillator in the detectors 124-1, 124-2 of the detector system 118, in one example. The image formed at the detector system 118 is also known as an x-ray projection or x-ray projection image.

In one example, the computer system 200 includes an image processor 220 that analyzes the x-ray projections and possibly performs the calculations necessary for tomographic reconstructions created from the x-ray projections. A display device 240, connected to the computer system 200, displays information from the x-ray CT system 100. An input device 250 such as a touch screen, keyboard, and/or computer mouse enables interaction between the operator, the computer system 200, and the display device 240.

The computer system 200 loads information from and saves information to a database 260 connected to the computer system 200.

Using user interface applications executing on the computer system 200 that display their interfaces on the display device 240, in one example, the operator defines/selects CT scan or calibration parameters. These include x-ray acceleration voltage settings, and settings for defining the x-ray energy spectrum of the scan and exposure time on the x-ray source system 102. The operator also typically selects other settings such as the number of x-ray projection images to create for the sample 114, and the angles to rotate the rotation stage 110 for rotating the sample 114 for an x-ray CT scan in the x-ray beam 104.

The computer system 200, with the assistance of its image processor 220, accepts the image or projection information from the detector system 118 associated with each rotation angle of the sample 114. The image processor 220 creates a separate projection image for each rotation angle of the sample 114, and combines the projection images using CT reconstruction algorithms to create 3D tomographic reconstructed volume information for the sample.

In order to compensate for beam hardening, the spectrum of the x-ray source system 102 must be known prior to executing scans of the sample 114 to reduce artifacts in the projections and/or the tomographic reconstructions generated by the x-ray CT system 100 for the sample 114.

FIG. 3A illustrates a calibration method for estimating the spectrum of the x-ray source system 102. These estimated spectra are then used by the image processor 220 to generate tomographic reconstructions of the sample 114 with reduced artifacts. During this method, the sample 114 is rotated or shifted out of the beam path 104.

In step 308, the computer system 200 receives instructions from an operator to select an air filter, N additional filters, and different combinations/pairs M of different acceleration voltage and detectors for the x-ray source system 102 and passes the instructions to the controller 210. At least one pair M for one acceleration voltage and one detector is required.

In step 310, the controller 210 selects a combination/next pair M of a detector 124-1/124-2 and an energy setting (e.g. acceleration voltage (kVp)) for the x-ray source system 102. Then, the controller 210 sends signals via the controller interface 130 of the filter heel 150 to rotate the filter wheel 150 until the AIR pre-filter 156 comes into the path of beam 104 in step 312.

In step 314, a transmission value is obtained for the currently selected filter (here, the AIR pre-filter 156) and stored to a buffer for the AIR pre-filter.

Then, in step 316, the filter wheel 150 is rotated to the next selected pre-filter, and the method transitions back to step 314 to obtain the transmission value for the next pre-filter using the same pair M of (acceleration voltage, detector) settings selected in step 310. Steps 314 and 316 are executed N times for the N additional filters other than the air filter 156. This is indicated by reference 317-N. Upon conclusion of each pass of step 314, the transmission value for the (current) pre-filter at the specified (acceleration voltage, detector) settings is then stored to a buffer for the current pre-filter. After the iterative processing steps 314/316 are repeated N times over the same pair M of (acceleration voltage, detector) settings, the method transitions back to step 310 to obtain the next pair M of (acceleration voltage, detector) settings. This is indicated by reference 319-M. Steps 310, 312 and 314/316 are then executed, and the transmission values for the air pre-filter 156 and the next pre-filter are calculated and stored to their respective buffers. Steps 310, 312 and 314/316 are repeated up to M times, corresponding to the number of M pairs of (acceleration voltage, detector) selections.

In step 320, a transmission curve for each pre-filter is created from the buffer of transmission values for each pre-filter, and attenuation curves are calculated from each of the transmission curves. Each of the transmission/attenuation curves is associated with a different pre-filter (LE1, LE2, . . . , LE6, HE1, HE2, . . . , HE6, BE1, BE2, BE3, and AIR 156 and possibly other pre-filters). The attenuation curve for each pre-filter is the minus logarithm of its associated transmission curve. The buffers of transmission values for each pre-filter, the transmission curves, and the attenuation curves are then stored as absorption reference data 230 to the computer system 200 and/or database 260.

According to step 321, the computer system 200 then calculates an estimate of the x-ray source spectrum, also known as a set of baseline spectra 354, by applying Expectation Maximization (EM) algorithms to the attenuation curves. For this purpose, in one example, a Monte Carlo simulated spectrum with specified absorption edges is utilized as an initial input for the EM algorithms so that the algorithms can converge much faster. More detail for the calculation of the set of baseline spectra 354 using the EM algorithms is provided in the method of FIG. 4, a description of which is included herein below.

The set of baseline spectra 354 can then be applied during subsequent x-ray scans of the sample 114 to remediate beam-hardening artifacts that may otherwise appear in tomographic reconstructions created from scans of the sample 114. In general, once the set of baseline spectra 354 is obtained, re-calibration including repeating steps 310-321 is not required on a daily basis or in each tomography scan, unless the X-ray tube 102 (or its target 103) or the detectors 124 are replaced or renewed.

Note that the selected acceleration voltages can be discrete, such as, 40 kVp, 50 kVp, 60 kVp, . . . , 160 kVp, at intervals of 10 kVp. If some specified acceleration voltage, such as 66 kVp or 115 kVp, is required in practice, then a spectra of x-rays for these acceleration voltages can be calculated by interpolation with the baseline spectra 354.

Figures 2, 3B:
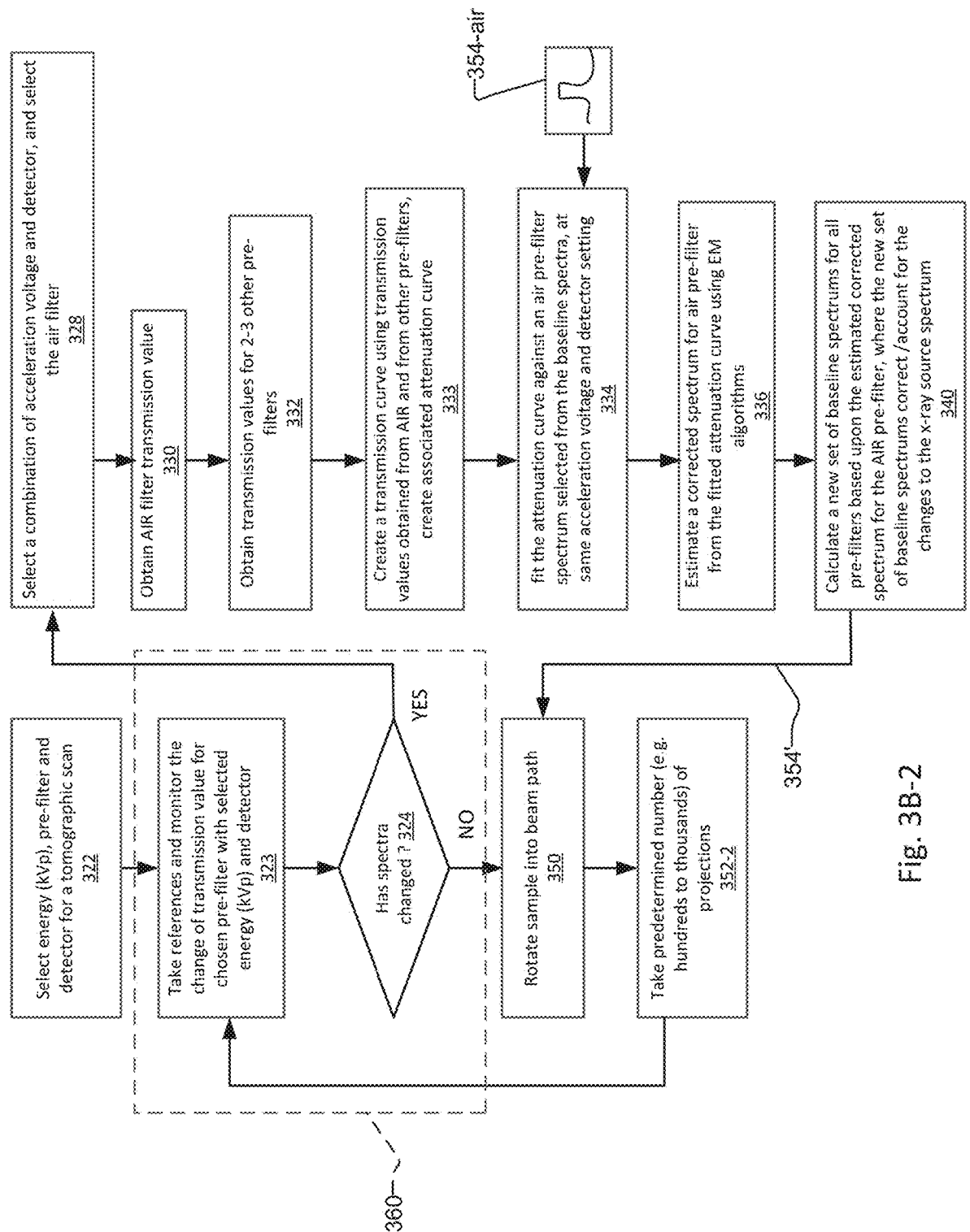

FIGS. 3B-1 and B-2 illustrate simplified workflows for creating tomographic reconstructions of a sample 114 combined with s-ray source spectrum monitoring. The tomographic reconstructions are created from x-ray-image projections generated from scanning the sample 114. The method of FIG. 3B-1 applies to a single, short-duration scan of the sample 114, whereas the method of FIG. 3B-2 applies to possibly multiple scans of the same sample 114 at a longer scan duration.

The spectrum monitoring aspect or function determines whether the spectrum of the x-ray source 102 has sufficiently changed during a scan of the sample 114, and can recalibrate the x-ray spectrum using the set of baseline spectra 354 created in the method of FIG. 3A. Reference 360 in FIG. 3B-1 and FIG. 3B-2 indicates the steps associated with the spectrum monitoring function, more simply referred to as a spectrum monitor 360. The spectrum monitor 360 includes steps 323 and 324.

The methods of FIGS. 3B-1 and 3B-2 include similar steps and execute in mostly a similar fashion. The methods are typically executed and controlled by the computer system 200, with any of the computationally-intensive activities possibly being performed by the image processor 220 or other co-processing system. The method of FIG. 3B-1 is described first in its entirety, followed by the description of FIG. 3B-2.

In FIG. 3B-1, according to step 322, a specified acceleration voltage, pre-filter and detector are selected as part of a scan of a sample 114. Then, references are taken in step 323. For setup of the spectrum monitor 360, the transmission value of a certain pre-filter is measured to determine whether the spectrum has changed from that specified by the baseline spectra 354. To determine whether the spectrum has changed, in one example, the measured transmission value is compared to the stored transmission value for the same combination of selected pre-filter, acceleration voltage, and detector in the absorption data 230. To determine whether the spectrum has changed, in another example, the measured transmission value is compared to a transmission value within the baseline spectra 354 at the same combination of x-ray acceleration voltage, pre-filter, and detector.

If it is determined that the spectrum of the x-ray source 102 has not changed in step 324, then the sample 114 is rotated into the beam path in step 350 and then projections are taken in step 352-1.

In general, with use, the spectra of the x-ray source 102 will change, however. For example, if a scan takes some hours or even days, x-ray spectra changes resulting from source target burn will often occur. So in general, a multiple-reference process will be required in scans of longer duration or between different scans, along with spectrum monitoring provided by the spectrum monitor 360.

If the spectrum change is determined to be significant in step 324 of FIG. 3B-1, such as being different than expected due to error or noise, then re-calibration of the spectrum of the x-ray source 102 is required and the method transitions to step 328 to begin the recalibration process. In current systems and methods, the typical spectrum measurements with phantoms had to repeated to recalibrate the x-ray source 102. In contrast, in a preferred embodiment of the x-ray CT system 100, once a the set of baseline spectra 354 is obtained via the method of FIG. 3A, the following spectrum re-calibration method is employed.

According to step 328, the method selects a combination of acceleration voltage and detector. The AIR (empty) filter 156 is then positioned into the beam path 104 by rotating the filter wheel 150. The same combination of acceleration voltage and detector, or common settings, are used in various steps after conclusion of step 328.

In step 330, the AIR filter transmission measurement is taken using the common settings. Then, in step 332, two or three or possibly more non-AIR pre-filters are selected for positioning into the beam path 104 to measure their transmission values at the common settings. In one example, one of the selected pre-filters is associated with measuring a high transmission value and one of the selected pre-filters is associated with measuring a lowest transmission value (<5%).

In step 333, a transmission curve is created from the measured transmission values for the air filter 156 obtained in step 330 and from the measured transmission values for the 2 or 3 other pre-filters obtained in step 332. An attenuation curve is then created from the transmission curve.

According to step 334, an air pre-filter spectrum is then selected from the set of baseline spectra 354, where the selected air filter spectrum is at the same combination of acceleration energy and detector as the "common settings" in previous steps 328, 330 and 332. The selected air pre-filter spectrum is indicated by reference "354-air".

The attenuation curve is then "fitted" against the selected air pre-filter spectrum, 354-air. In general, polynomial fitting methods can be used for this purpose.

In step 336, the method estimates a corrected spectrum for the air pre-filter across all combinations of acceleration voltage and detectors from the fitted attenuation curve by using EM algorithms. The EM algorithms create the estimated corrected spectrum for the air pre-filter 156 according to the air pre-filter spectrum at the "common settings" within the fitted attenuation curve from step 334. More information on creation of the estimated corrected spectrum for the air pre-filter is included within the description of FIG. 4 hereinbelow.

According to step 340, the method then calculates a new set of baseline spectra 354', across all combinations of (acceleration voltage, pre-filter, detector), based upon the estimated corrected spectrum for the air pre-filter created in step 336. The new set of baseline spectra 354' correct/account for the changes to the energy spectra of the x-ray source 102 detected in step 324.

Upon completion of step 340, the method transitions to step 350.

In step 350, the sample 114 is rotated or shifted back into the beam path 104 and projections are obtained until end of the tomographic scan in step 352-1 or the predetermined number of projections have been obtained.

FIG. 3B-2 shows how references must be re-taken in the middle of long scans of a sample 114. As in the method of FIG. 3B-1, step 322 performs a scan of the sample 114 at a selected tuple of (energy, pre-filter, detector) setting, and steps 323, 324 of the spectrum monitor 360 are applied to determine whether the energy spectra of the x-ray source 102 has changed. If the spectra has changed, the method transitions to step 328 to recalibrate the x-ray source 102. Otherwise, the method transitions to step 350 and rotates or shifts the sample 114 into the beam path 104, and the method transitions to step 352-2 to obtain x-ray projections of the sample 114.

Unlike step 351-1 in the method of FIG. 3B-1, however, step 352-2 obtains many more x-ray image projections of the sample 114 due to the longer scan duration. For example, after a threshold of number of projections (predetermined number) or a predetermined scan time, the sample 144 is rotated or shifted out of the beam path and the method transitions back to step 323 to re-apply the spectrum monitor 360. New references are taken and the transmission value of a certain pre-filter is measured in step 323. Here again, based upon a comparison of the measured transmission value to what would be predicted from the set of baseline spectra 354, it is determined whether the x-ray source spectrum has changed in step 324.

If the x-ray source spectrum did not change, the sample is rotated or shifted in the beam path again in step 350 to continue collecting a predetermined number of x-ray image projections in step 352-2.

Figure 4:
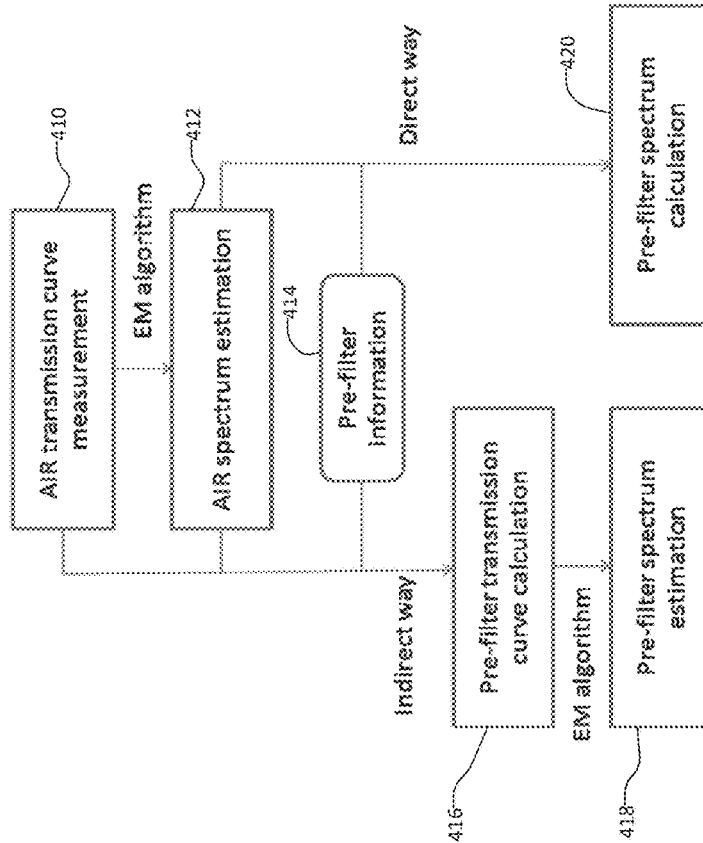
FIG. 4 is a flow diagram showing a method which provides more detail for calculating the spectra from the combinations of selected acceleration voltage, pre-filters, and detectors in the methods of FIGS. 3A, 3B-1, and 3B-2.

FIG. 4 shows a method for calculating the spectra of the combinations of the selected acceleration voltage, pre-filters, and detector of the baseline spectra 354 in step 321 of FIG. 3A, for calculating the estimated corrected spectrum for the air pre-filter in step 336 and for calculating the new baseline spectra 354' in step 340 of FIG. 3B-1 and FIG. 3B-2 herein above.

This method can be implemented as a software program such as by the computer system 200 and possibly by the image processor 220 to generate tomographic reconstructions with reduced artifacts. In step 340, the calculations will yield a new set of baseline spectra 354' that will replace the original baseline spectra 354 calculated in the method of FIG. 3A. Then, the new baseline spectra 354' can be used in tomographic reconstruction of the sample 114 by the image processor 220, for example, which can eliminate or significantly reduce artifacts in the tomographic reconstructions due to beam hardening, in the preferred embodiment.

In step 410, an AIR transmission curve measurement is obtained. Now, suppose the spectrum of the combination of the selected acceleration voltage+AIR+detector (i.e. AIR spectrum) is $S_0(E)$, where E denotes energy. As a result, in step 412, the AIR spectrum $S_0(E)$ can be estimated by EM algorithms based on the attenuation curve as measured by a few pre-filters, in step 414.

For example, there are N pre-filters in the filter wheel. They are made of different materials (or some are made of the same material but with different thickness). Their linear attenuation coefficients are $\mu_i(E)$, i=1, 2, 3, ..., N, respectively, and their thicknesses are $T_i$, i=1, 2, 3, ..., N, respectively.

Suppose the intensity (i.e., photon counts per unit time) of incident x-rays is $I_0$ which can be measured by using the empty (air) spot in the filter wheel. By rotating the filter wheel, the intensity of downstream x-rays which pass through a certain pre-filter is $I_i$, i=1, 2, 3, ..., N, then an attenuation curve of the combination of the selected acceleration voltage+AIR+detector is measured:

$$(I_0/I_0, I_1/I_0, I_2/I_0, \ldots, I_i/I_0, \ldots, I_N/I_0)$$

$S_0(E)$ can be estimated according to the above attenuation curve.

For each pre-filter, the relationship among $S_0(E)$, $I_0$, $I_i$, $T_i$, and $\mu_i(E)$ is provided:

$$I_i = I_0 \int S_0(E) e^{-\mu_i(E)T_i} dE \tag{1}$$

The attenuation curves of all the combinations of the selected acceleration voltage+pre-filters+detector (i.e. pre-filter spectra) can be calculated with $S_0(E)$.

Note that the workflow of spectrum change monitoring and recalibration can also be used for X-ray CT system diagnosis. For example, if the spectrum monitor 360 determines that the x-ray spectra of the x-ray source 102 has changed, this could indicate that the X-ray tube and/or detector are not operating efficiently or have problems. The set of new baseline spectra 354' created in accordance with the method of FIG. 4 can then be used to diagnose the X-ray CT system 100.

There are 2 different ways to obtain pre-filter spectra as shown in FIG. 4, indicated by paths labeled as "Indirect way" and "Direct way."

1) The indirect way (more accurate) is first described herein below.

According to step 416, a pre-filter transmission curve calculation is obtained. For this purpose, take the k-th pre-filter as an example: suppose the k-th pre-filter in the original filter wheel is always in the beam path and another 'virtual' filter wheel comprising or possibly consisting of an identical set of pre-filters acts as the spectrum measurement tool, then the intensity of downstream x-rays which pass through the k-th pre-filter in the original filter wheel and a certain pre-filter (denoted by j) in the 'virtual' filter wheel is $I_{kj}$, j=0,1,2,3, ..., N, that is, $$I_{kj} = I_0 \int S_0(E) e^{-\mu_k(E)T_k} e^{-\mu_j(E)T_j} dE \tag{2}$$

When j=0, it means that the empty (air) spot in the 'virtual' filter wheel is in the beam path and $\mu_0(E)=0$ and $T_0=0$, then $I_{k,0}$ means the reference intensity of the k-th pre-filter in the original filter wheel.

If (2) is divided by (1), that is, $$\frac{I_{kj}}{I_j} = \frac{I_0 \int S_0(E) e^{-\mu_k(E)T_k} e^{-\mu_j(E)T_j} dE}{I_0 \int S_0(E) e^{-\mu_j(E)T_j} dE} \quad j = 0, 1, 2, \ldots, N \tag{3}$$

Then

-continued $$I_{kj} = I_j \frac{\int S_0(E) e^{-\mu_k(E)T_k} e^{-\mu_j(E)T_j} dE}{\int S_0(E) e^{-\mu_j(E)T_j} dE} \quad j = 0, 1, 2, \ldots, N$$

According to (3), we obtain an attenuation curve relevant to the combination of the selected acceleration voltage+the kth pre-filter+detector:

$$(I_{k,j=0}/I_{k,j=0}, I_{k,j=1}/I_{k,j=0}, I_{k,j=2}/I_{k,j=0}, \ldots, I_{k,j}/I_{k,j=0}, \ldots, I_{k,j=N}/I_{k,j=0})$$

As a result, in step 418, the spectrum of the combination of the selected acceleration voltage+the k-th pre-filter+detector, $S_k(E)$, can be estimated via EM algorithms according to the above attenuation curve.

2) The direct way (approximate) is now described herein below.

Step 420 describes calculation of the pre-filter spectrum calculation, $S_k(E)$. $S_k(E)$ can be calculated directly by attenuating $S_k(E)$ by pre-filters as follows:

$$S_k(E) = \frac{S_0(E) e^{-\mu_k(E)T_k}}{\int S_0(E) e^{-\mu_k(E)T_k} dE} \quad (4)$$

The direct way provides approximate (e.g. corrected spectra 354') with a much shorter calculation time.

Figure 5:
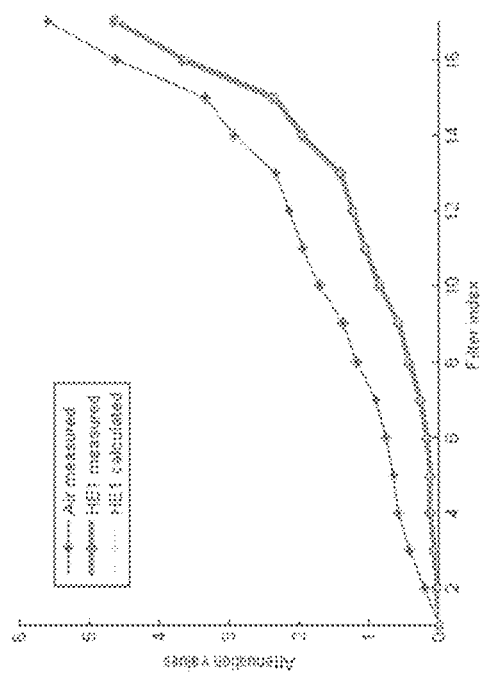
FIG. 5 shows a plot of different attenuation curves including attenuation values as a function of filter index for AIR (i.e., air pre-filter) measured, HE1 pre-filter measured and HE1 pre-filter calculated.

FIG. 5 show plots of three different attenuation curves of attenuation values as a function of filter index for AIR. (i.e., air pre-filter) measured, HE1 pre-filter measured, and HE1 pre-filter calculated.

The acceleration voltage of the x-ray source 102 used was 70 kVp. There were 16 filters in the filter wheel 150. The attenuation curve of the combination of 70 kVp and HE1 pre-filter was also measured by another set of the filters (e.g. for the HE1 measured curve).

The attenuation curve of the combination of 70 kVp and HE1 (e.g., HE1 calculated curve) was calculated from the attenuation curve of the combination of 70 kVp and Air (Air measured curve). Obviously, the calculated result is very consistent with the measured one.

Figure 6:
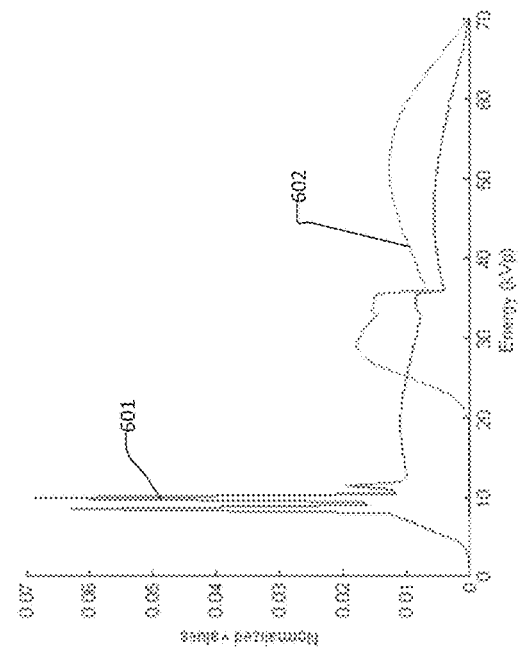
FIG. 6 is a plot of two different estimated corrected x-ray energy spectra as a function of x-ray acceleration energy (kVp)

FIG. 6 is a plot of different estimated corrected x-ray source spectra 601 and 602 as a function of energy (kVp). The estimated corrected x-ray source spectra 601/602 are included in a new set of baseline spectra 354' created, in part, using the attenuation curves shown in FIG. 5. Each of the estimated corrected x-ray source spectra 601/602 plot normalized counts of x-ray photons at different energies/acceleration voltages, in kVp.

Estimated corrected spectrum 601 is based upon transmission values for the combination of 70 kVp and Air pre-filter and was estimated based upon the "Air measured" attenuation curve of FIG. 5. In a similar fashion, the estimated corrected spectrum of the combination of 70 kVp and HE1 pre-filter 602 was estimated based upon the "HE1 calculated curve in FIG. 5.

Figure 7:
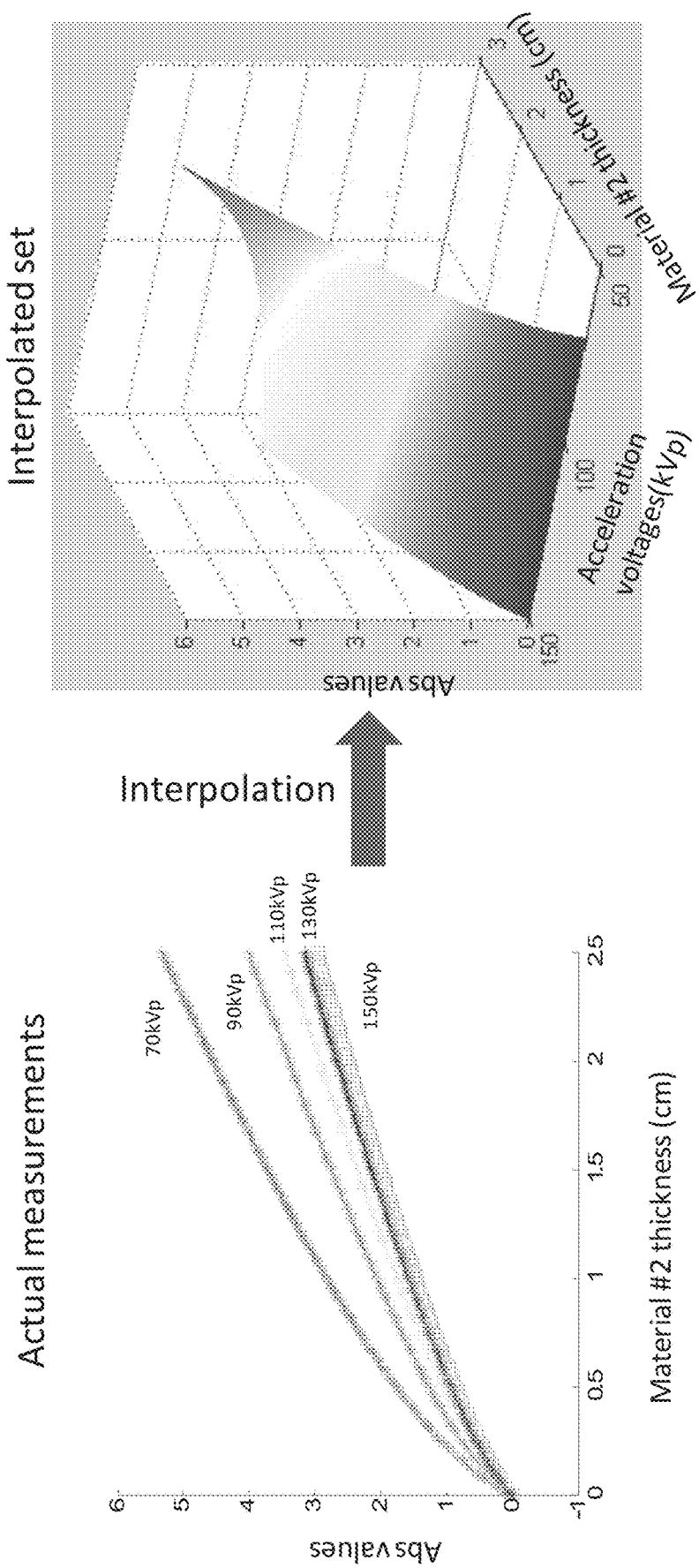
FIG. 7 is an example for interpolations for the attenuation curves (i.e., the attenuation curves are the minus logarithm of the transmission curves) of finer acceleration voltages from actual attenuation curve measurements with a set of filters under 70 kVp, 80 kVp, 90 kVp, . . . , 150 kVp (Here only 70 kVp, 90 kVp, 110 kVp, 130 kVp and 150 kVp are shown)

FIG. 7 shows examples of attenuation curves from which the baseline spectra 354 are created. Suppose some attenuation curves of discrete acceleration voltages, such as 70 kVp, 80 kVp, . . . , 150 kVp at intervals of 10 kVp, are measured by using Material #2 filters with different thickness. The resulting data is shown in the left-side plot of attenuation as a function of filter thickness in centimeters. Then a map of attenuation curves can be interpolated smoothly for finer discrete acceleration voltages, such as, 75 kVp. 89 kVp, . . . , 114 kVp, etc. This is shown by the right side plot of attenuation as a function of acceleration voltage and filter thickness.

The spectrum of the x-rays emitted from the x-ray source 102 may change over time as the x-ray image projections are obtained. For example, x-ray source target burn will change the spectra.

Figure 8:
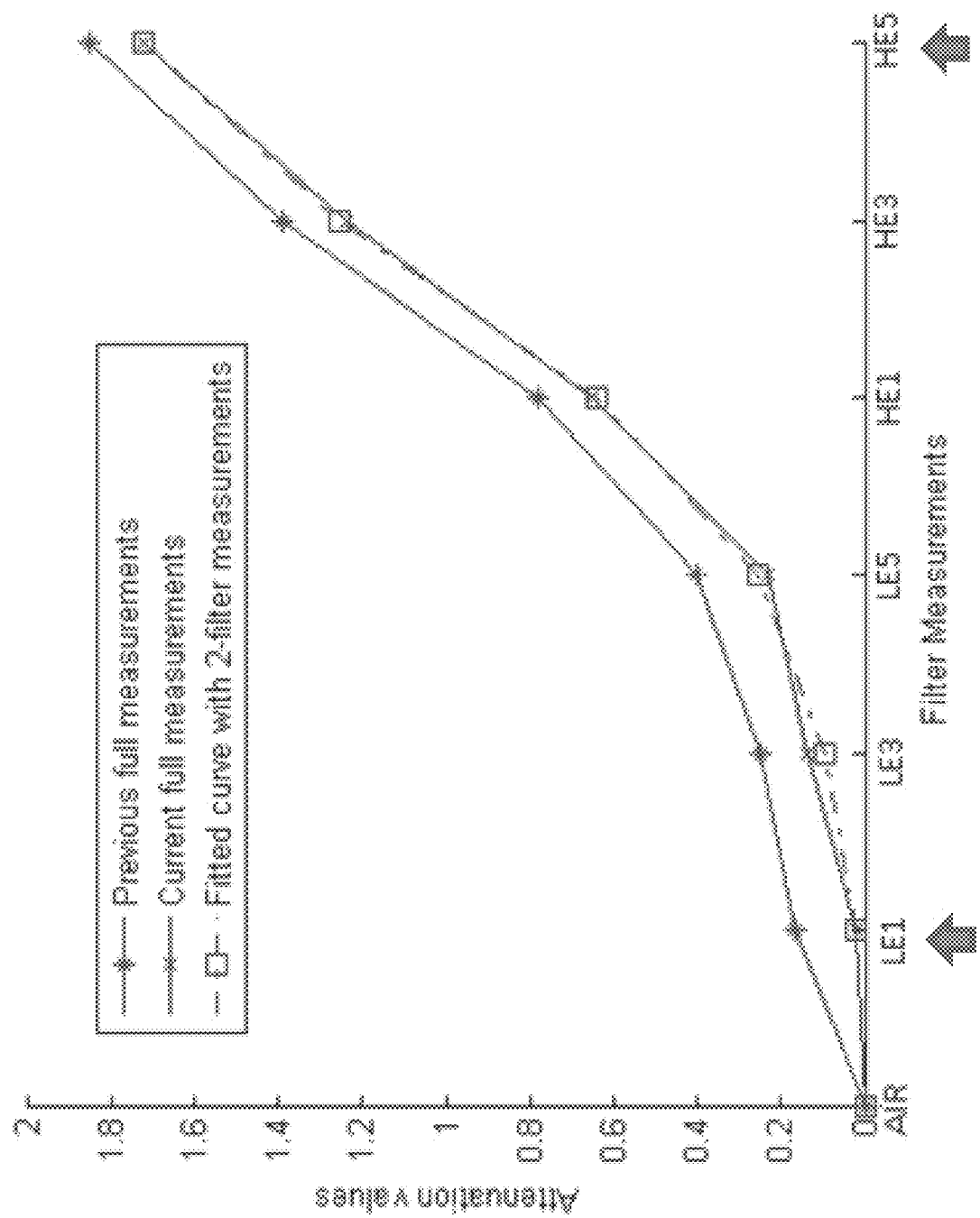
FIG. 8 shows plots of attenuation curves for the x-ray source spectra of an x-ray CT system created in accordance with principles of the present invention, where it has been determined that the x-ray source spectra has changed over time, and where a plot of a fitted attenuation curve created using only two pre-filter transmission measurements (LE1 and HE5) can be utilized to estimate corrections to the changed x-ray energy spectra across all pre-filter settings, acceleration voltages, and detector combinations.

FIG. 8 shows different plots of attenuation curves for an x-ray source 102, where the spectra of the beam of x-rays emitted from the x-ray source 102 are determined to have changed over time. The attenuation curves include a "previous full measurements" attenuation curve, a "current full measurements" attenuation curve, and a fitted attenuation curve. Though attenuation curves are created over all x-ray energies/acceleration voltages, only the attenuation curves of a selected acceleration voltage (here, 60 kVp) are shown.

The "previous full measurements" attenuation curve was created during initial startup of the x-ray CT system 102 using transmission measurements taken across all pre-filter settings, acceleration voltages, and detector combinations, such as via the method of FIG. 3A. A previous baseline spectra 354 was then created from the "previous full measurements" attenuation curves.

Upon determining that the x-ray source spectrum has changed, a "current full measurements" attenuation curve is also created using transmission measurements taken across all pre-filter settings, acceleration voltages, and detector combinations, and a current baseline spectra 354 is created from the "current full measurements" attenuation curves.

It is important to note that the creation of the "current full measurements" attenuation curves and associated current baseline spectra 354 is not necessary and is created here only for reference and comparison purposes. Specifically, current systems and methods typically must perform this step for correcting changes to the x-ray source spectrum of an x-ray source 102. In contrast, in accordance with the method of FIGS. 3B-1/3B-2, an operator can estimate corrections to the changed x-ray spectrum across all pre-filter settings, acceleration voltages, and detector 124 combinations based upon transmission measurements taken of as few as 2 or 3 pre-filters at a common acceleration voltage and detector combination.

Suppose an attenuation curve of 60 kVp+AIR+detector combination is extracted from the previous baseline spectra 354. It is named as 'previous full measurements' in the plot. After a few days, the spectrum of the beam emitted from the x-ray source 102 of the x-ray CT system 100 is determined to have changed.

Nevertheless, transmission measurements for only 2, for example, pre-filters (LE1 and HE5) are required in step 332 of FIGS. 3B-1/3B-2 in order to estimate the corrections to the changed spectra of the x-rays in the x-ray beam 103 across all combinations of pre-filter settings, acceleration voltages, and detectors 124. An estimation attenuation curve of 60 kVp+AIR+detector is fit according to the previous attenuation curve and two pre-filter measurement values, as shown as the curve 'Fitted curve with 2-filter measurements' in the plot.

It is important to note how closely the "fitted curve" attenuation curve plot corresponds to the "current full measurement" attenuation curve plot. The fitted curve attenuation plot almost entirely overlaps that of the "current full measurement" attenuation curve for the same selected acceleration voltage.

While this invention has been particularly shown and described with references to preferred embodiments thereof, it will be understood by those skilled in the art that various changes in form and details may be made therein without departing from the scope of the invention encompassed by the appended claims.

What is claimed is:

1. An x-ray source spectrum measurement and estimation method in an x-ray CT system, the method comprising:
   determining baseline spectra for x-rays emitted from an x-ray source of the x-ray CT system at different combinations of at least one x-ray acceleration voltage, more than one filter and at least one detector;
   during operation of the x-ray CT system, monitoring the x-rays to determine changes to the x-ray source spectrum; and
   in response to determining that the x-ray source spectrum has changed, calculating new baseline spectra based upon measuring transmission values of at least one or more filters by creating an estimated corrected spectrum for an air filter using the measured transmission values of at least 2 or 3 filters and calculating the new baseline spectra from the estimated corrected spectrum for the air filter.

2. The method of claim 1, wherein the method is used for tomographic reconstruction and beam hardening correction.

3. The method of claim 1, wherein the method is used for multi energy computed tomography.

4. The method of claim 1, wherein the method is used for x-ray CT system diagnosis.

5. The method of claim 1, wherein the monitoring of the x-rays to determine changes to the x-ray source spectrum is performed by:
   obtaining a transmission value using a combination of an x-ray acceleration voltage, one filter, and a detector; and
   comparing the obtained transmission value to a transmission value within the baseline spectra at the same combination of the x-ray acceleration voltage, the one filter, and the detector.

6. The method of claim 1, wherein determining the baseline spectra comprises:
   obtaining transmission measurements using the combinations of x-ray acceleration voltages, filters and detectors;
   calculating transmission curves for each of the filters using the transmission measurements; and
   calculating attenuation curves for each of the filters from the transmission curves.

7. The method of claim 1, wherein determining the baseline spectra comprises:
   calculating attenuation curves for each of the filters based upon transmission measurements obtained using the combinations of x-ray acceleration voltages, filters and detectors; and
   applying Expectation Maximization (EM) algorithms to the attenuation curves.

8. The method of claim 1, wherein calculating new baseline spectra based upon measuring transmission values of at least 2 or 3 filters is accomplished with no phantoms present.

9. The method of claim 1, further comprising using the baseline spectra and the new baseline spectra during scans of a sample to correct for beam hardening in tomographic reconstructions of the sample.

10. An x-ray source spectrum measurement and estimation method in an x-ray CT system, the method comprising:
    determining baseline spectra for x-rays emitted from an x-ray source of the x-ray CT system at different combinations of at least one x-ray acceleration voltage, more than one filter and at least one detector;
    during operation of the x-ray CT system, monitoring the x-rays to determine changes to the x-ray source spectrum; and
    in response to determining that the x-ray source spectrum has changed, calculating new baseline spectra based upon measuring transmission values of at least one or more filters,
    wherein calculating the new baseline spectra comprises:
    identifying a combination of acceleration voltage and detector used to measure the transmission values of at least 2 or 3 filters;
    measuring a transmission value for an air filter at the identified acceleration voltage and detector combination; and
    creating a transmission curve using the transmission values for the air filter and for the at least 2 or 3 filters and creating an attenuation curve from the transmission curve.

11. The method of claim 10, wherein calculating new baseline spectra comprises:
    selecting an air filter spectrum at the common acceleration voltage and detector combination from the baseline spectra;
    fitting the attenuation curve against the selected air filter spectrum; and
    estimating a corrected spectrum for the air filter according to the air filter spectrum at the common acceleration voltage and detector combination within the fitted attenuation curve using EM algorithms.

12. An x-ray spectrum measurement and estimation method in an x-ray microscope system for applications such as tomographic reconstruction, beam hardening correction, multi (dual) energy computed tomography (CT) and x-ray microscope system diagnosis, the method comprising:
    determining spectra for combinations of x-ray source acceleration voltages, pre-filters and/or detectors; and
    before operation of the x-ray microscope, estimating or calculating spectra for the combinations of the source acceleration voltages, pre-filters and/or detectors from the measured transmission values by measuring transmission values for several pre-filters; and
    in response to determining that the x-ray source spectrum has changed during the operation of the x-ray microscope, calculating new baseline spectra based upon measuring transmission values of at least one or more filters by creating an estimated corrected spectrum for an air filter using the measured transmission values of at least 2 or 3 filters and calculating a new baseline spectra from the estimated corrected spectrum for the air filter.

13. A x-ray CT system, the system comprising:
    an x-ray imaging system comprising an x-ray source, filters, and a detector system; and
    a computer system for determining baseline spectra for x-rays emitted from the x-ray source at different combinations of at least one x-ray acceleration voltage of the x-ray source, more than one filter and at least one detector of the detector system, monitoring the x-rays to determine changes to the x-ray source spectrum, and in response to determining that the x-ray source spectrum have changed, calculating new baseline spectra by identifying a combination of acceleration voltage and detector used to measure the transmission values of at least 2 or 3 filters, measuring a transmission value for an air filter at the identified acceleration voltage and detector combination, and creating a transmission curve using the transmission values for the air filter and for the 2 or 3 filters and creating an attenuation curve from the transmission curve.

14. The system of claim 13, wherein the new baseline spectra are used for tomographic reconstruction and beam hardening correction.

15. The system of claim 13, wherein the new baseline spectra are used for multi energy computed tomography.

16. The system of claim 13, wherein the new baseline spectra are used for x-ray CT system diagnosis.

17. The system of claim 13, wherein the computer system determines changes to the x-ray source spectrum by:

obtaining a transmission value using a combination of an x-ray acceleration voltage, one filter, and a detector; and comparing the obtained transmission value to a transmission value within the baseline spectra at the same combination of the x-ray acceleration voltage, the one filter, and the detector.

18. The system of claim 13, wherein the computer system determines the baseline spectra by:

obtaining transmission measurements using the combinations of x-ray acceleration voltages, filters and detectors;

calculating transmission curves for each of the filters using the transmission measurements; and calculating attenuation curves for each of the filters from the transmission curves.

19. The system of claim 13, wherein the computer system determines the baseline spectra by:

calculating attenuation curves for each of the filters based upon transmission measurements obtained using the combinations of x-ray acceleration voltages, filters and detectors; and applying Expectation Maximization (EM) algorithms to the attenuation curves.

* * * * *